United States Patent
Bracht et al.

(10) Patent No.: US 7,146,735 B2
(45) Date of Patent: Dec. 12, 2006

(54) METHOD OF MAKING A BEARING RING FOR A LARGE ROLLER BEARING

(75) Inventors: Josef Bracht, Erwitte (DE); Jörg Rollmann, Waltrop (DE); Bernd Stakemeier, Erwitte (DE); Johannes Wozniak, Lippstadt (DE)

(73) Assignee: Rothe Erde GmbH, Dortmund (DE)

( * ) Notice: Subject to any disclaimer, the term of this patent is extended or adjusted under 35 U.S.C. 154(b) by 50 days.

(21) Appl. No.: 10/459,419

(22) Filed: Jun. 11, 2003

(65) Prior Publication Data

US 2004/0000053 A1    Jan. 1, 2004

(51) Int. Cl.
*B21D 53/10* (2006.01)
*C21D 9/40* (2006.01)
*H05B 6/10* (2006.01)

(52) U.S. Cl. ............... 29/898.13; 29/898.06; 29/898.063; 29/898.066; 148/572; 219/642; 384/455

(58) Field of Classification Search ............. 29/898.13, 29/898.06, 898.066, 898.063; 219/600, 635, 219/642; 148/566, 567, 570, 571, 572; 384/455
See application file for complete search history.

(56) References Cited

U.S. PATENT DOCUMENTS

| | | | | |
|---|---|---|---|---|
| 2,145,864 A | * | 2/1939 | Denneen et al. | 148/526 |
| 2,288,033 A | * | 6/1942 | Somes | 148/571 |
| 2,419,691 A | * | 4/1947 | Shafer | 403/42 |
| 3,108,913 A | * | 10/1963 | Sommer | 148/572 |
| 3,305,409 A | * | 2/1967 | Cary | 148/572 |
| 3,623,128 A | * | 11/1971 | Seulen et al. | 219/639 |
| 3,909,314 A | * | 9/1975 | Armstrong et al. | 148/572 |
| 3,944,446 A | * | 3/1976 | Bober | 148/572 |
| 4,363,946 A | * | 12/1982 | Busemann | 219/640 |
| 4,599,502 A | * | 7/1986 | Khare et al. | 219/614 |
| 4,759,808 A | | 7/1988 | Novorsky | |
| 5,134,264 A | | 7/1992 | Burger et al. | |
| 5,680,693 A | * | 10/1997 | Griebel et al. | 29/602.1 |

(Continued)

FOREIGN PATENT DOCUMENTS

DE    1879514    *    9/1963

(Continued)

OTHER PUBLICATIONS

Patent Abstract, JP 11242992, Sep. 7, 1999.

(Continued)

*Primary Examiner*—Eric Compton
(74) *Attorney, Agent, or Firm*—Andrew Wilford

(57) ABSTRACT

A bearing ring for a large roller bearing is formed with at least one annular race which is hardened by heating by juxtaposing that race with an inductor across a spacing which is maintained during the heating and then quenching. The spacing is controlled selectively so that it is:

- 1 to 2 times a depth T of hardening of the surface layer for a radial-bearing race,
- 0.6 to 1 times the depth T of hardening of the surface layer for an axial-bearing race whose inner diameter corresponds to an inner diameter of the bearing ring, at an outer edge of the axial-bearing race, 1.5 to 2 times the depth T of hardening of the surface layer for the axial-bearing race whose inner diameter corresponds to an inner diameter of the bearing ring at an inner edge thereof, and varying continuously between the outer edge and the inner edge, and
- uniformly 0.6 to 1 times the depth T of hardening of the surface layer for an axial-bearing race whose inner diameter is greater than that of the bearing ring.

6 Claims, 3 Drawing Sheets

U.S. PATENT DOCUMENTS 5,796,078 A    8/1998    Ottenwaelder et al.

FOREIGN PATENT DOCUMENTS

| DE | 2011141    | * | 9/1971 |
| DE | 3623119    | * | 5/1987 |
| DE | 199 55 385 |   | 7/2000 |
| EP | 1375684    |   | 1/2004 |
| JP | 52-127417  | * | 10/1977 |
| JP | 60 141827  |   | 7/1985 |
| JP | 2002-180129| * | 6/2002 |

OTHER PUBLICATIONS

Patent Abstract, JP 60141827, Jul. 26, 1985.

* cited by examiner

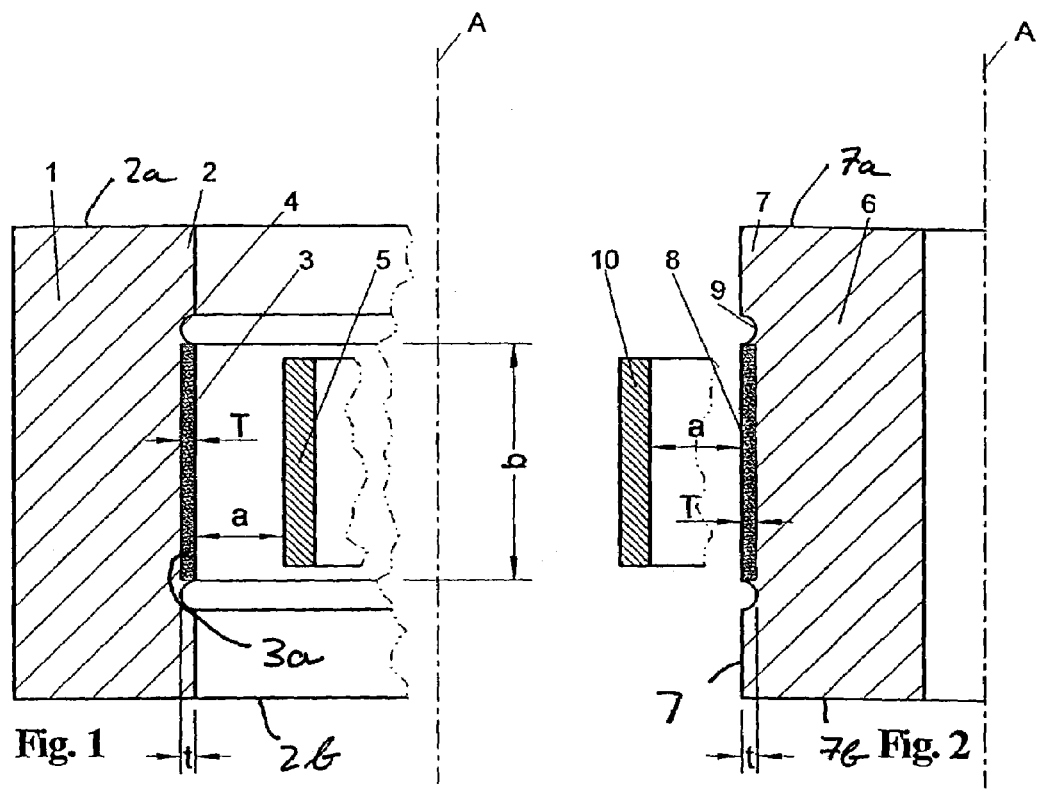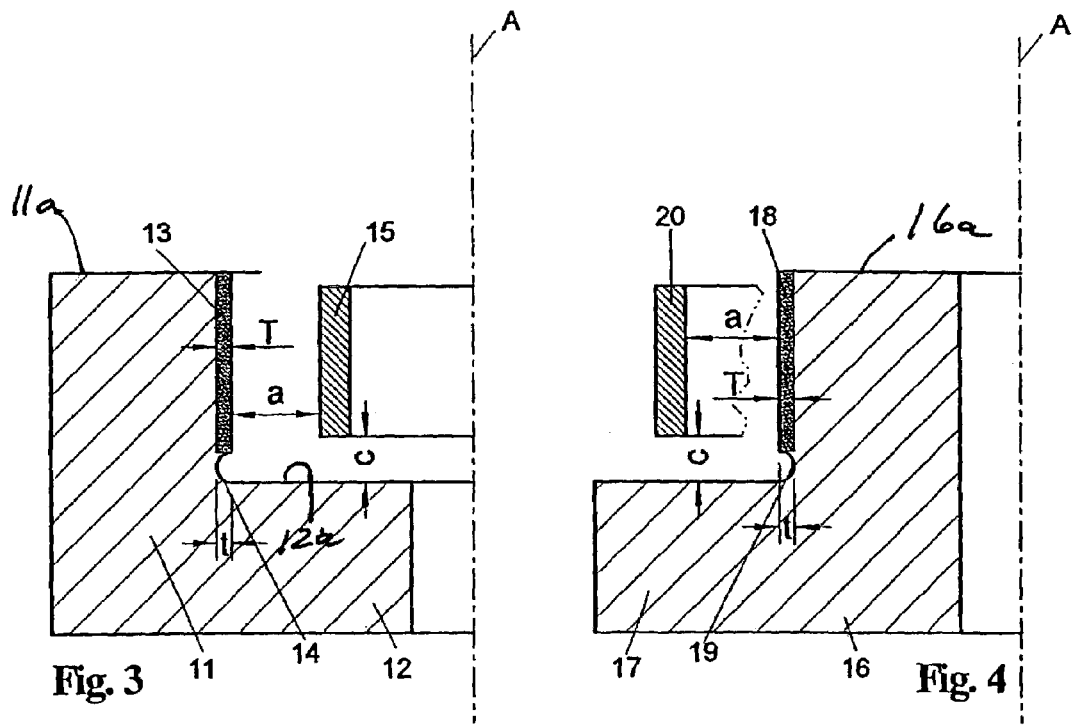

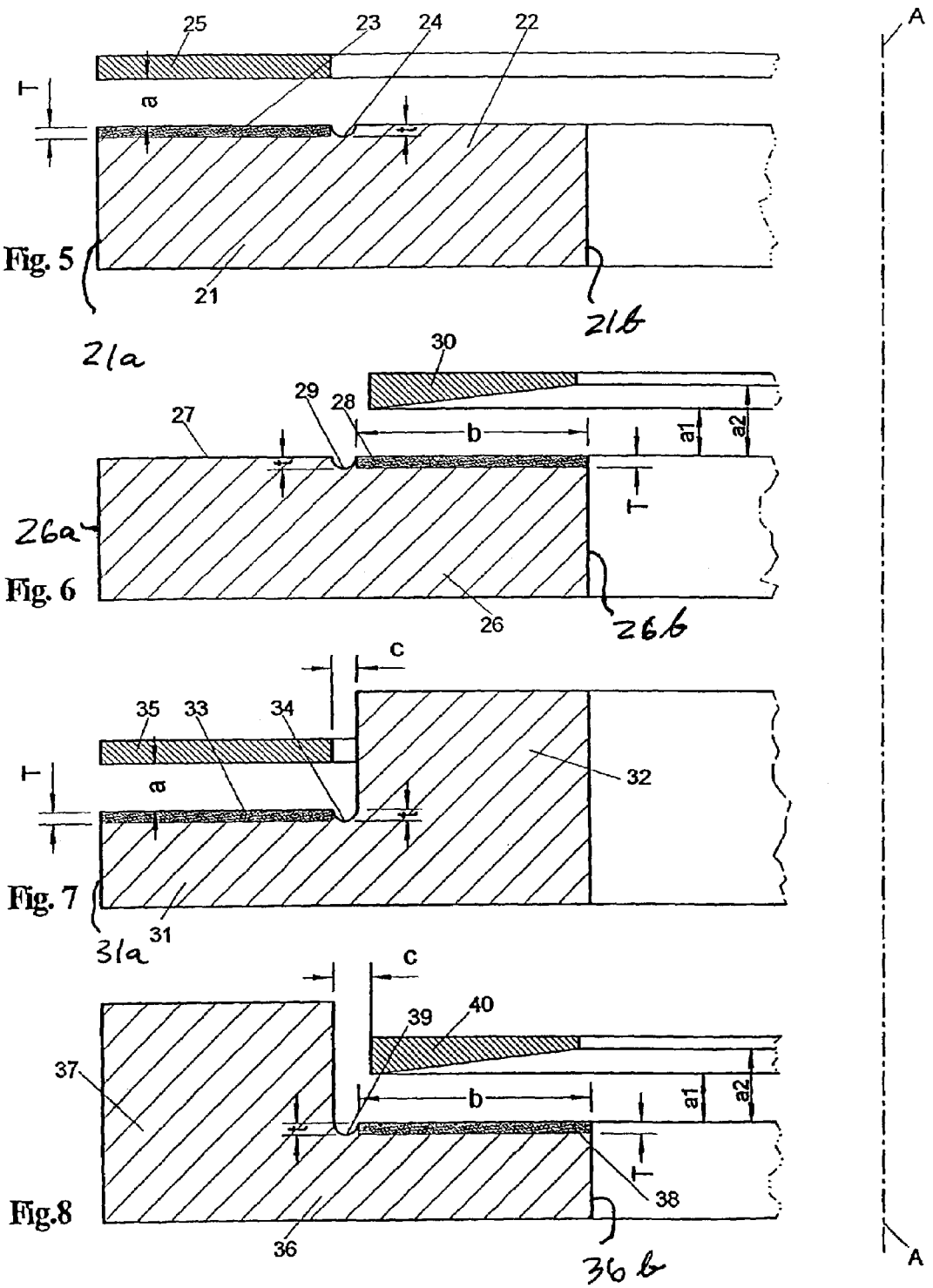

METHOD OF MAKING A BEARING RING FOR A LARGE ROLLER BEARING

FIELD OF THE INVENTION

Our present invention relates to a method of making a bearing ring for a large roller bearing and, more particularly, for producing bearing rings for large roller bearings which have bearing races with hardened surface layers.

BACKGROUND OF THE INVENTION

Large roller bearings, in the sense of the present invention, are roller bearings which have axial bearing races or radial bearing races and which are formed with bearing rings provided with such races and which can be mounted in bearing assemblies, usually with bearing housings which are attached by bolts or otherwise assembled to a particular structure and can have multiple bearing rings, multiple bearing races, bearing rings juxtaposed with other bearing rings such that either may be an inner ring and the other an outer ring, systems which are assembled together so that multiple rows of balls or rollers are provided on the races and bearing rings which are of a wide variety of configurations.

In general, the bearing rings which are fabricated for such purposes are machined so as to have an axial bore, the races themselves are finished following machining operations and the bearing ring can then be hardened. The bearing rings can be formed as nose rings, support rings, holder rings, disk like axial-race rings and the like.

An axial bearing race, for the purposes of the present invention will be understood to be a race which presses axially upon an array of rollers at least in part or against which an array of rollers press axially. Correspondingly, a radial bearing race is a race which can take up or apply a supporting force in a radial direction.

Large roller bearings in general, depending upon the configuration, can have one, two or more pairs of races between which respective roller arrays are provided and one, two or more bearing rings provided with these races, fabricated by machining and then hardened.

In conventional processes for fabricating bearing rings for such large roller bearings, the hardening can be effected by an inductive heating and a shower type quenching system. The inductive hardening is effected as a feed hardening in which the inductor is held in place and conforms to the contour or the race of the bearing ring and the bearing ring is continuously advanced relative to the inductor and the quenching shower so that each segment of the bering race is heated and quenched in a progressive and continuous manner. An advantage of this system is that it allows the races of bearing rings of practically any size to be hardened.

A drawback, however, is that it is not possible to be absolutely certain that all parts of the bearing race will be uniformly hardened and hence at the conclusion of the hardening there can be incompletely hardened segments and segments which remain soft and thus significantly reduce the life of the bearing and the properties thereof.

The defects in continuous hardening as practiced in these earlier systems appear to derive from some slippage in the combined heating and quenching of the workpiece as practiced segment wise around the bearing ring as the latter is rotated past the inductor and the quenching spread.

It is also known to heat the bearing race of a bearing ring for a large roller bearing with an oxyacetylene flame and then to quench the bearing ring in an oil or emulsion bath.

With this so-called flame hardening, a plurality of burners are uniformly distributed around the periphery of the bearing ring and juxtaposed with the bearing race to be hardened. The bearing ring is rotated about an axis which as a rule can be a vertical axis perpendicular to the plane of the bearing race so as to attempt to distribute the heating from the oxyacetylene torches uniformly over the periphery of the entire bearing ring. Immediately upon attainment of the predetermined hardening temperature for the race to be hardened, the burners are shut down and the bearing ring is immersed in the oil bath or the emulsion both for quenching. This system has a significant drawback in that it poses dangers to personnel who must handle the bearing ring and carry out the operations because of the need to manipulate explosive gas mixtures and because of significant fume development. Furthermore, the heating process can only be controlled to a limited extent so that the strength properties of the product may be limited at least in part. More particularly, it is observed that there are races which are formed which have a lesser hardness than is desired and a larger grain structure in the hardened race which can reduce the life of the fabricated bearing.

In a Japanese Patent Application Publication under number Sho 60-141827, a process has been described for producing a bearing race with a hardened surface layer in a groove like recess in a bearing ring in which the hardening surface layer is formed by rotating a cylinder element containing the bearing race about its axis, heating it with an electromagnetic field from at least one inductor simultaneously with the rotation while maintaining a spacing between the inductor and the bearing race and then quenching the bearing race by spraying it with a coolant following the heating operation.

This process, in which a constant gap is provided between the bearing race and the inductor allows an intensive application of heat at the bearing race portion juxtaposed with the inductor.

However, it has been discovered that simply by carrying out a heating in this manner, it is not possible to reliably harden bearing races in a controlled manner for bearing rings for large bearings.

OBJECTS OF THE INVENTION

It is, therefore, the principal object of the present invention to so improve the method last described that it can serve for the production of bearing rings for large bearings in which the bearing race has a uniformly high hardness without any slip in the hardening effect and a uniformly fine grained structure all along the bearing rings in spite of the fact that the heating is effected progressively as the ring is rotated.

Another object of this invention is to provide a method for the purposes described which allows a bearing race for a large bearing to be hardened in a controlled manner so as to uniformly along the entire race have a high hardness and uniform small grained structure with control of the hardening depth.

SUMMARY OF THE INVENTION

Surprisingly, we have found that these objects can be achieved by controlling the spacing between the inductor and the bearing race juxtaposed therewith in accordance with the depth of hardening or the thickness of the surface layer to be produced.

More particularly, these objects are achieved according to the invention, for a radial bearing race, by providing the spacing of the inductor from the surface of the radial bearing race, i.e. the so called coupling distance, so that it is one to two times the depth of the hardened surface layer formed thereon, by controlling this distance in the case of an axial bearing race which has its inner edge at the inner surface of the bearing ring so that the spacing at the outer edge of the hardened layer is 0.6 to 1 times the depth of hardening and at the inner edge of this layer is 1.5 to 2 times the hardening layer depth and so that the spacing varies continuously and monotonically from the outer edge to the inner edge, and in the case of an axial bearing race whose inner diameter is greater than that of the inner surface of the bearing ring, so that the spacing is uniformly between 0.6 and 1 times the depth of hardening or the thickness of the surface layer of the race which is hardened. The peripheral speed of the rotating bearing ring is preferably of the order of 0.2 meter/second during the inductive heating.

More particularly, therefore, the method of the invention comprises the steps of:

(a) forming a bearing ring having at least one annular race selectively configured as a radial-bearing race or an axial-bearing race;

(b) rotating the bearing ring about an axis thereof while heating a surface layer of the annular race by juxtaposing the surface layer with an inductor adapted to induce the heating of the surface layer over a spacing between the inductor and the surface layer maintained during the heating;

(c) quenching the bearing ring to harden the surface layer; and (d) controlling the spacing selectively so that the spacing is:

(d1) 1 to 2 times a depth T of hardening of the surface layer for a radial-bearing race, (d2) 0.6 to 1 times the depth T of hardening of the surface layer for an axial-bearing race whose inner diameter corresponds to an inner diameter of the bearing ring, at an outer edge of the axial-bearing race, 1.5 to 2 times the depth T of hardening of the surface layer for the axial-bearing race whose inner diameter corresponds to an inner diameter of the bearing ring at an inner edge thereof, and varying continuously between the outer edge and the inner edge, and (d3) uniformly 0.6 to 1 times the depth T of hardening of the surface layer for an axial-bearing race whose inner diameter is greater than that of the bearing ring.

With the method of the invention, not only is there a uniform and slip-less hardening of the entire bearing race but by comparison with previously known methods, the duration of the hardening process is significantly reduced.

According to a feature of the invention, especially when the hardened surface layer lies adjacent a region of the bearing ring which is not to be hardened, the bearing ring can be provided with a relief, setback or recess prior to heating by the inductor which separates the region to be hardened from the adjacent region which is not to be hardened. Thus, upon hardening of the surface layer, the setback or relief prevents heating of the adjoining region by the inductor.

The bearing races to be hardened can be radial bearing races or axial bearing races as has been noted. The radial bearing races are intended to be under load radially of the rotation axis of the bearing and can be formed as cylindrical surfaces to the extent that they are to engage cylindrical roller bodies.

The axial bearing races are intended to be under load in the direction of the rotation axis and can be formed by circular ring shaped planar surfaces perpendicular to the rotation axis.

The determination as to where, adjacent a hardened surface layer, a region which is not to be hardened may lie, in the case of a cylindrical external radial bearing race, is a reference to a region of the bearing ring which can have the same diameter, a smaller diameter or a larger outer diameter in the radial bearing race. In the case of an axial bearing, such a region may have a smaller inner diameter than the bearing race or a larger diameter than the bearing race and may lie in the same plane as the bearing race or may be setback axially therefrom or even project forwardly of the plane of the bearing race. The recess can have a depth which can be one to two times the depth of the surface layer and hence one to two times the thickness of the hardened layer.

In the case of a bearing ring which apart from the bearing race to be hardened has a neighboring region which is not to be hardened and is stepped away form the bearing race, the inductor can have a spacing from the bearing ring in the stepped region which is laterally separated from the bearing ring by a gap equal from 1.5 to 2 times the depth or thickness of the hardened layer. With this spacing, the region which is not to be hardened can remain unaffected by the inductor. The surface which is thus laterally juxtaposed with the inductor can be a radial surface in the case of an axial bearing or an axial surface in the case of a radial bearing race.

The method of the invention can be carried out with an apparatus which includes the indicator and the means for rotating the bearing ring relative to the inductor. The inductor can have one or more windings.

BRIEF DESCRIPTION OF THE DRAWING

The above and other objects, features, and advantages will become more readily apparent from the following description, reference being made to the accompanying drawing in which:

FIG. 1 is a partial cross section through a bearing ring having an inner radial bearing race and showing an annular inductor magnetically coupled therewith whereby the radial bearing race is located substantially centrally of the bearing ring although its width constitutes only a fraction of the width of the bearing ring;

FIG. 2 is a cross sectional view through an embodiment generally similar to that of FIG. 1 but illustrating the hardening of an outer radial bearing race;

FIG. 3 is an axial section through part of a radial bearing ring with an internal bearing race;

FIG. 4 is a cross section view similar to that of FIG. 3 but illustrating an external radial bearing race;

FIG. 5 is a cross sectional view showing the method as applied to an axial bearing race along the outer periphery of the bearing race;

FIG. 6 is a cross sectional view similar to FIG. 5 but showing the hardening of a bearing race along the inner periphery of the bearing ring;

FIG. 7 is a fragmentary axial cross section through an axial bearing formed with a boss functioning as a support for a roller or ball cage;

FIG. 8 is a cross sectional view through an axial bearing ring in which the hardened bearing surface lies along the inner periphery;

SPECIFIC DESCRIPTION

Figure 9:
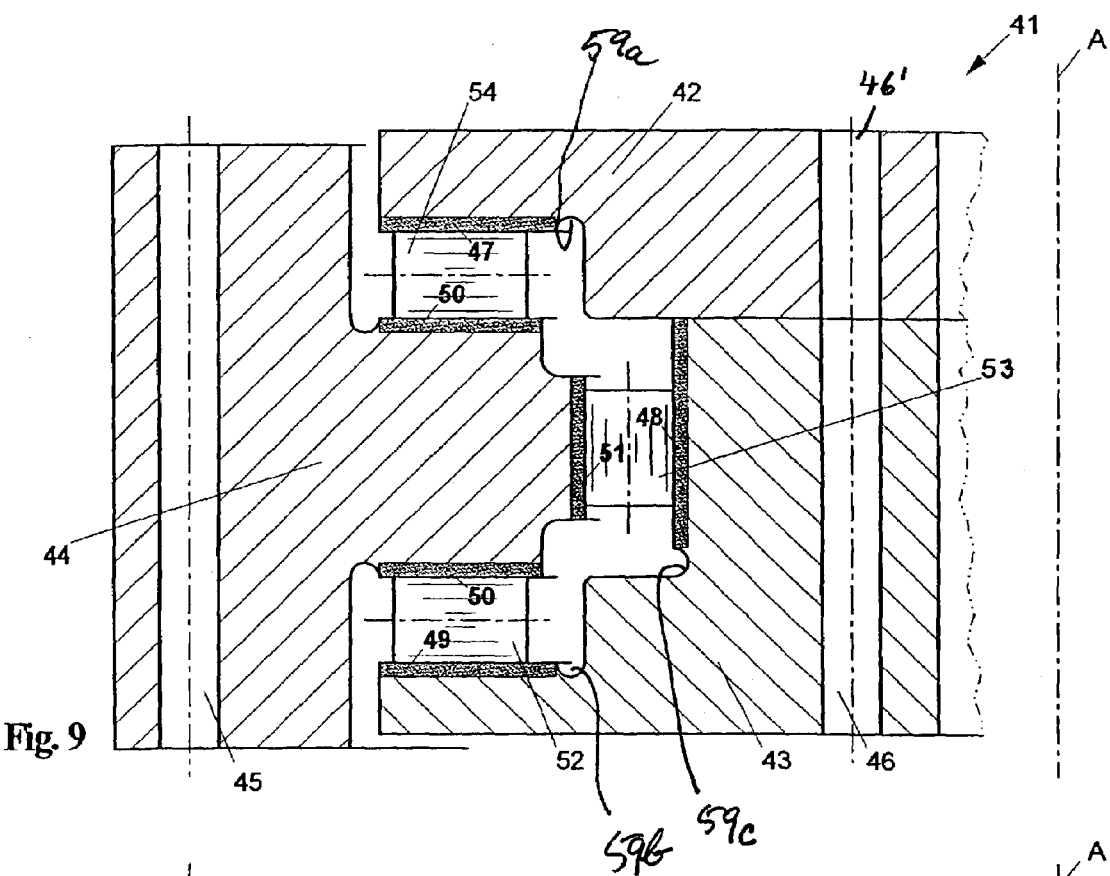
FIG. 9 is an axial section through a part of a three-row bearing system showing the hardening of axial and radial bearing races.

In FIG. 1, we have shown an external bearing ring 1 which is formed on its inner surface with a central radial bearing race 3 whose width b is less than the entire axial width of this bearing ring and is flanked by two regions 2 which are not to be hardened and which run to the axial end faces 2a and 2b. A pair of reliefs 4, in the form of grooves or recesses, separate the bearing race 3 from the non-hardened regions 2.

The bearing race 3 has a hardened depth T and the reliefs 4 may have depths t which are one to two times the hardened depth T. To heat the region of the race to the hardening temperature, an annular multicoil inductor 5 is provided whose width can correspond to the width b of the radial race or be slightly smaller than it.

The outer diameter is smaller by twice a coupling distance a than the inner diameter of the radial race 3 which is to be hardened. The hardened surface layer has been represented at 3a. The coupling distance a, which is the spacing of the inductor from the radial bearing race 3, is maintained, in accordance with the invention in the range of 1 to 2 times the thickness T of the surface layer, i.e. 1 to 2 times the hardened depth T.

Similarly, for the inner race 8 of a bearing ring 6, i.e. the inner bearing ring of a large bearing, the inductor 10 is spaced by the coupling distance a from the bearing race 8 by a distance which is 1 to 2 times the thickness T of the hardening of the race. The radial bearing race 8 is also located centrally of the axial width of the inner bearing ring 6 between a pair of regions 7 which are to remain unhardened and which run to the end faces 7a and 7b of the bearing ring 6. The regions 7 are separated from the bearing race 6 by reliefs 9 in the form of annular grooves of a depth t which can correspond to that of FIG. 1. The inductor 10 is concentric with the axis A of the bearing ring 6 and has a diameter which is greater by twice the coupling distance a than the outer diameter of the bearing race 8. The width of the inductor 10 corresponds to the width of the bearing ring 8 or is only slightly smaller than it.

Both these bearing rings may be hardened by rotating the bearing ring about its axis A by heating the race 3 or 8 to the hardening temperature and then quenching the entire bearing ring by any conventional hardening quenching process.

As an alternative to FIGS. 1 and 2, the radial bearing race 3 or 8 can be offset from the center of the bearing ring and can run to one or the other of the end surface 2a, 2b or 7a, 7b. For the hardening of such a variant, it is only necessary to increase the width of the inductor 5 or 10 in the same direction by a corresponding amount.

Radial bearing rings are also shown in FIGS. 3 and 4. In FIGS. 3 and 4, the radial bearing rings include an outer ring 11 and an inner ring 16 with respective hardened radial races 13 and 18 each reaching to an axial end 11a and 16a of the respective ring and extending substantially inwardly from that end to substantially the middle of the bearing ring. At the middle of the bearing ring the radial race 13, 18 is separated by means of a setback, groove or recess 14 or 19 from a cage abutment flange 12 or 17 against which the roller cage of the bearing can rest. The respective inductors 15 and 20 juxtaposed with the radial race 13 or 18 is spaced therefrom by a coupling distance a which can bear the aforedescribed relationship to the thickness of the hardened layer T described in connection with FIGS. 1 and 2. The depth t can be one to two times T as has been described with respect to FIGS. 1 and 2 and the inductors 15 and 20 can be spaced from the end face 12a of the flange 12 or 17 by a distance c which also is one to two times the thickness T of the hardened layers.

FIGS. 5–8 show embodiments of axial bearing races and hence axial bearing rings. In FIG. 5, for example, the axial bearing ring 21 has an axial race 23 running to the outer cylindrical periphery 21a of the ring 21 which can also have an inner periphery 21b. The axial bearing race 23 runs from the radial midposition of the ring 21 to the outer periphery. Inwardly of the bearing race 23 on its axial face, a nonhardened region 22 is provided which is separated by a setback, groove or recess 24 from the axial bearing race 23. To heat the bearing race to the hardening temperature, a disk-shaped inductor with the same width as the bearing race 23 can be provided at the coupling distance a which is maintained at substantially one to two times the thickness T of the hardened layer during the heating process. After heating with rotation of the ring, the latter can be quenched. The depth t of the recess 24 can also correspond to the depth of the setback in FIGS. 1 and 2.

The bearing ring 26 of FIG. 6 has an axial bearing race 28 which runs from the center of the ring substantially to the inner periphery 26b and the region between the center of the ring body and the outer periphery 26a is formed by a region 27 which is not to be hardened. A setback, groove or recess 29 separates the hardened race 28 from the region 27. The hardened race 28 is to have a radial width b and over this region or a slightly smaller region is juxtaposed with an inductor 30 whose surface confronting the bearing race corresponds to the surface of a fulcrum of a cone.

The inductor is so shaped that the coupling distance a1 is less at the inner part of the bearing race 28 than the coupling distance a2 at the outer part proximal to the inner periphery 26b of the ring. The coupling distance a2 here should range between 1.5 and 2 times the thickness of the hardened region T and, while the coupling distance a1 can correspond to that of FIGS. 1 and 2, i.e. between 1 and 2 times a1. The coupling distance a2 can, preferably, be twice as large as the distance a1 and the coupling distance can vary monotonically from the outer edge of the hardened region to the inner edge thereof. The depth t can be one to two times T.

The bearing rings 31 and 36 of FIGS. 7 and 8, respectively, are also axial bearing rings but have the bearing races 33 and 38 extending to the outer periphery 31a and the inner periphery 36b, respectively. Each of these bearing rings has a cage abutment 32 or 37 in the form of an annular boss. The annular boss 32 is located inwardly of the baring race 32 while the annular boss 37 is located outward of the bearing race 38.

In these cases as well, the bearing races 33 and 38 are separated from adjacent regions which are not to be hardened by respective grooves, setbacks or recesses 34 and 39 of the depth t previously described.

To heat the bearing race 33 (FIG. 7), the same inductor can be used as was employed to heat the bearing race 23 of the bearing ring 21 of FIG. 5. Care must be taken, in that case, to maintain a lateral spacing c of the inductor 35 from the boss 32, the dimension of the spacing c corresponding to that given in connection with FIGS. 3 and 4. To heat the bearing race 38, which runs to the inner periphery 36b of the ring 36, an inductor 40 can be used which is the same as the inductor 30 employed in FIG. 6 and which has the coupling distances a1 and a2 as was described in connection therewith and the bearing ring of FIG. 6.

FIG. 9 shows a three-row roller bearing 41 with its axis of rotation A and comprised of an owner or nose ring 44 and an inner ring comprised of a support ring 43 and a holder ring 42. The nose ring is shown in conjunction with two inductors again in FIG. 10 to illustrate how the heating is effected of the axial and radial race surfaces.

The support ring 43 and the holder ring 42 each has a bore 46 or 46' through which bolts can be asserted, when the bores are aligned, to assemble the bearing. The three rows of rollers are shown at 52, 53 and 54, the rollers 52 and 54 forming axial bearing rollers and the rollers 53 forming the radial bearing rollers of the bearing.

The bolts may also secure the bearing rings to the construction which may be rotatable or stationary and for which the bearing forms a journal. The nose ring 44 also has bores 45 which are parallel to the axis A and can accommodate bolts to attach the nose ring to adjoining structures.

While the support ring 43 shown as the lower ring for the inner races, has one axial bearing race 49 and one radial bearing race 48, like the outer bearing race 18 of FIG. 4, the holder ring 42 has one axial bearing race 47 like the bearing race 33 of FIG. 7.

The nose ring 44 is provided with an annular projection which is formed with one inner radial race 51 and with upper and lower axial bearing races 50. The annular regions 56 adjoining the bearing races 50 through the intermediary of grooves or setbacks 59 of the depth t can be cage abutments and are not to be hardened. The axial and radial races are all hardened by the systems illustrated in FIGS. 1–8. While the rollers 52, 53, and 54 are shown to be free, in practice they will usually be received in respective roller cages which have not been shown and positioned between the surfaces 56 and corresponding surfaces on the support and holder rings 43, 42.

Figure 10:
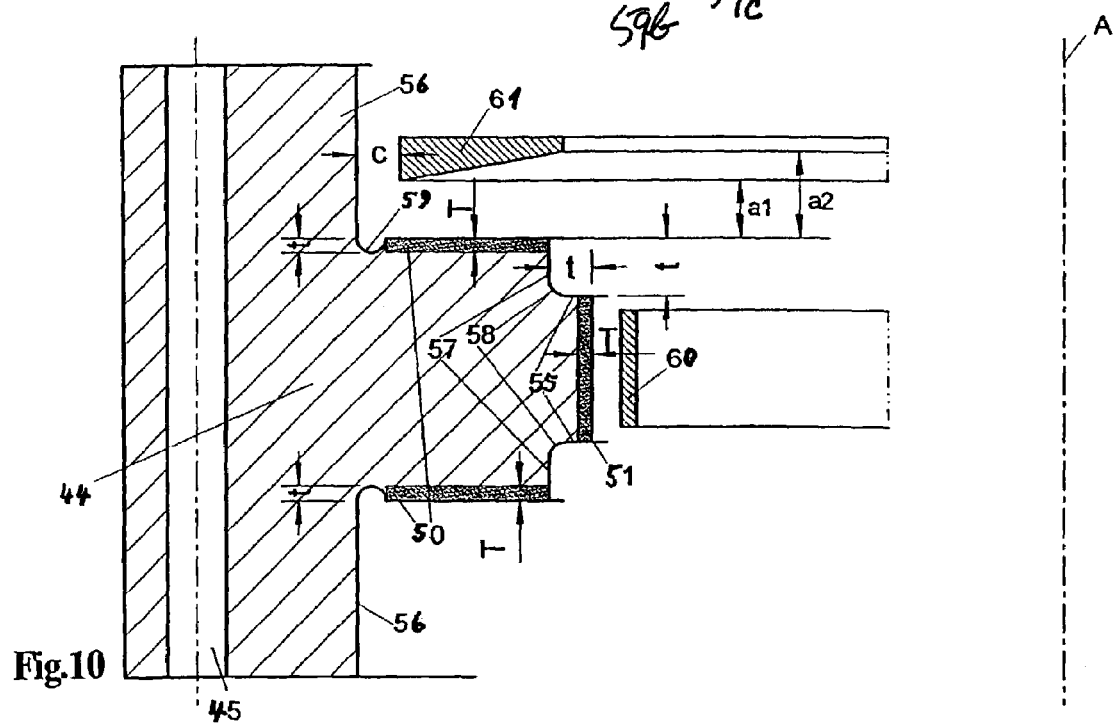
FIG. 10 is a cross sectional view through a bearing ring illustrating the hardening of one of the axial bearing races and the radial bearing race in a nose ring configuration.

As FIG. 10 shows, moreover, the setbacks or grooves 59, 59a, 59b and 59c (FIG. 9) may all have depth t which are one to two times the thickness T of the adjoining bearing race hardened layers. Similar setbacks can be provided at 58 adjacent the bearing race 51.

The heating of all of the bearing races of the roller bearing 41 can be carried out as has already been described in that the bearing ring is rotated relative to the respective inductor, e.g. the inductor 60 for the bearing race 51, or inductors as shown at 60 and 61 only diagrammatically and heated to a temperature sufficient, upon quenching of the bearing ring to harden the surface layer of the race to the desired thickness T while the gap widths between the bearing race and the inductor are maintained at values a, a1 and a2 previously described. The quenching can be effected in oil baths.

We claim:

1. A method of making a bearing ring for a large roller bearing the method comprising the steps of:
   (a) forming a bearing ring having at least one annular race centered on an axis and configured as an axial-bearing race;
   (b) rotating said bearing ring about the axis thereof while heating an entire annular surface layer of said annular race by juxtaposing said annular surface layer with an annular inductor centered on the axis and adapted to induce the heating of substantially all of said surface layer over a spacing between said inductor and said surface layer maintained during said heating;
   (c) quenching said bearing ring to harden said surface layer; and
   (d) controlling said spacing selectively so that said spacing is:
      (d1) 0.6 to 1 times the depth T of hardening of said surface layer for an axial-bearing race whose inner diameter corresponds to an inner diameter of the bearing ring at an outer edge of said axial-bearing race, 1.5 to 2 times the depth T of hardening of said surface layer for said axial-bearing race whose inner diameter corresponds to an inner diameter of the bearing ring at an inner edge of said axial-bearing-race, and varying continuously between said outer edge and said inner edge; and
      (d2) uniformly 0.6 to 1 times the depth T of hardening of said surface layer for an axial-bearing race whose inner diameter is greater than the diameter of the inner surface of the bearing ring.

2. The method defined in claim 1 wherein said annular race is disposed adjacent a portion of said bearing ring which is not to be hardened, said method further comprising the step of forming a setback between said annular race and the adjoining region which is not to be hardened.

3. The method defined in claim 2 wherein said setback has a depth t which is one to two times the depth T of hardening of the surface layer.

4. The method defined in claim 1 wherein said inductor has a lateral edge spaced from a step of said bearing ring which is not to be hardened, said method further comprising maintaining a lateral spacing c between said step and said edge of said inductor at 1.5 to 2 times the depth T of said surface layer.

5. A method of making a bearing ring for a large roller bearing, the method comprising the steps of:
   (a) forming a bearing ring having at least one annular race centered on an axis and configured as an axial-bearing race adjacent a portion of the bearing ring which is not to be hardened;
   (b) rotating said bearing ring about the axis thereof while heating an annular surface layer of said annular race by juxtaposing said surface layer with an annular inductor centered on the axis and adapted to induce the heating of substantially all of said surface layer except the Portion that is not to be hardened over a spacing between said inductor and said surface layer maintained during said heating;
   (c) quenching said bearing ring to harden said surface layer;
   (d) controlling said spacing selectively so that said spacing is 1 to 2 times a depth T of hardening of said surface layer for an axial-bearing race; and
   (e) forming a setback between said annular race and the adjoining region which is not to be hardened, said setback having a depth t which is one to two times the depth T of hardening of the surface layer.

6. The method defined in claim 1 wherein in step (c) substantially all of the annular surface is simultaneously quenched.

* * * * *

UNITED STATES PATENT AND TRADEMARK OFFICE
CERTIFICATE OF CORRECTION

PATENT NO. : 7,146,735 B2 Page 1 of 1
APPLICATION NO. : 10/459419
DATED : December 12, 2006
INVENTOR(S) : Josef Bracht et al.

It is certified that error appears in the above-identified patent and that said Letters Patent is hereby corrected as shown below:

On Title Page
Item 30 insert
-- Foreign Application Priority Date
 GERMANY 10228333.8, 06/26/2002 --

Signed and Sealed this

Twentieth Day of March, 2007

JON W. DUDAS
*Director of the United States Patent and Trademark Office*